(12) United States Patent
Sandstrom

(10) Patent No.: US 11,215,184 B1
(45) Date of Patent: Jan. 4, 2022

(54) HI-FLOW VARIABLE SPEED PUMP WITH WIRELESS REMOTE CONTROL

(71) Applicant: Thomas Sandstrom, Fort Lauderdale, FL (US)

(72) Inventor: Thomas Sandstrom, Fort Lauderdale, FL (US)

( * ) Notice: Subject to any disclaimer, the term of this patent is extended or adjusted under 35 U.S.C. 154(b) by 188 days.

(21) Appl. No.: 16/391,925

(22) Filed: Apr. 23, 2019

Related U.S. Application Data

(63) Continuation of application No. 15/342,278, filed on Nov. 3, 2016, now Pat. No. 10,267,316.

(60) Provisional application No. 62/250,169, filed on Nov. 3, 2015.

(51) Int. Cl.

| | |
|---|---|
| *F04D 15/00* | (2006.01) |
| *H02K 11/33* | (2016.01) |
| *H02K 9/19* | (2006.01) |
| *G08C 17/02* | (2006.01) |
| *F04D 13/06* | (2006.01) |
| *H02P 6/08* | (2016.01) |
| *H02K 5/10* | (2006.01) |
| *F04D 29/58* | (2006.01) |

(52) U.S. Cl.
CPC ..... *F04D 15/0066* (2013.01); *F04D 13/0686* (2013.01); *G08C 17/02* (2013.01); *H02K 9/19* (2013.01); *H02K 11/33* (2016.01); *H02P 6/08* (2013.01); *F04D 29/5806* (2013.01); *F04D 29/5813* (2013.01); *H02K 5/10* (2013.01)

(58) Field of Classification Search
CPC .... F04D 1/00; F04D 13/0686; F04D 15/0066; F04D 29/5813; F04D 29/5806; G08C 17/02; H02K 5/10; H02K 9/19; H02K 11/33; H02P 6/08
See application file for complete search history.

(56) References Cited

U.S. PATENT DOCUMENTS

| | | | |
|---|---|---|---|
| 3,238,878 A | 3/1966 | Martin | |
| 4,013,384 A | 3/1977 | Oikawa | |
| 4,998,865 A | 2/1991 | Nakanishi et al. | |
| 5,294,840 A | 3/1994 | Vellenga | |
| 5,629,590 A * | 5/1997 | Yamamoto | G08C 17/02 |
| | | | 318/16 |

(Continued)

*Primary Examiner* — David C Kramer
*Assistant Examiner* — Joseph S. Herrmann
(74) *Attorney, Agent, or Firm* — Mark D. Bowen, Esq.; Malin Haley DiMaggio & Bowen, P.A.

(57) ABSTRACT

A high-capacity pump fabricated with improved motor cooling and corrosion resistant components and powered by a variable-speed brushless DC motor suitable for use with a wide variety of applications. A brushless 12V DC motor is controlled by a manual and wireless variable speed control means to provide unparalleled flow control. The motor is contained within the housing in a sealed cavity in the housing, wherein the cavity is filled with mineral oil which maximizes heat transfer to facilitate motor cooling. A PVC impeller is contained within a PVC section of the housing thereby creating a corrosion resistant impeller section. The pump of the present invention has achieved improved performance over known pumps and is capable of delivering 4,500 gallons per hour (GPH) at 6 feet of head pressure, while only drawing 30 amps at 12 Volts DC. Wireless remote control of the pump is achieved via a wireless enabled device.

6 Claims, 6 Drawing Sheets

(56) References Cited

U.S. PATENT DOCUMENTS

| | | | | |
|---|---|---|---|---|
| 5,667,362 A * | 9/1997 | Murai | ............... | F04D 15/0066 |
| | | | | 417/41 |
| 5,670,852 A | 9/1997 | Chipperfield | | |
| 6,034,465 A | 3/2000 | McKee | | |
| 7,407,371 B2 * | 8/2008 | Leone | ............... | F04D 15/0088 |
| | | | | 417/423.15 |
| 8,471,686 B2 * | 6/2013 | Park | ............... | G06F 3/0338 |
| | | | | 340/12.22 |
| 10,267,316 B1 * | 4/2019 | Sandstrom | ............... | H02K 5/10 |
| 2006/0153714 A1 | 7/2006 | Hsu | | |

* cited by examiner

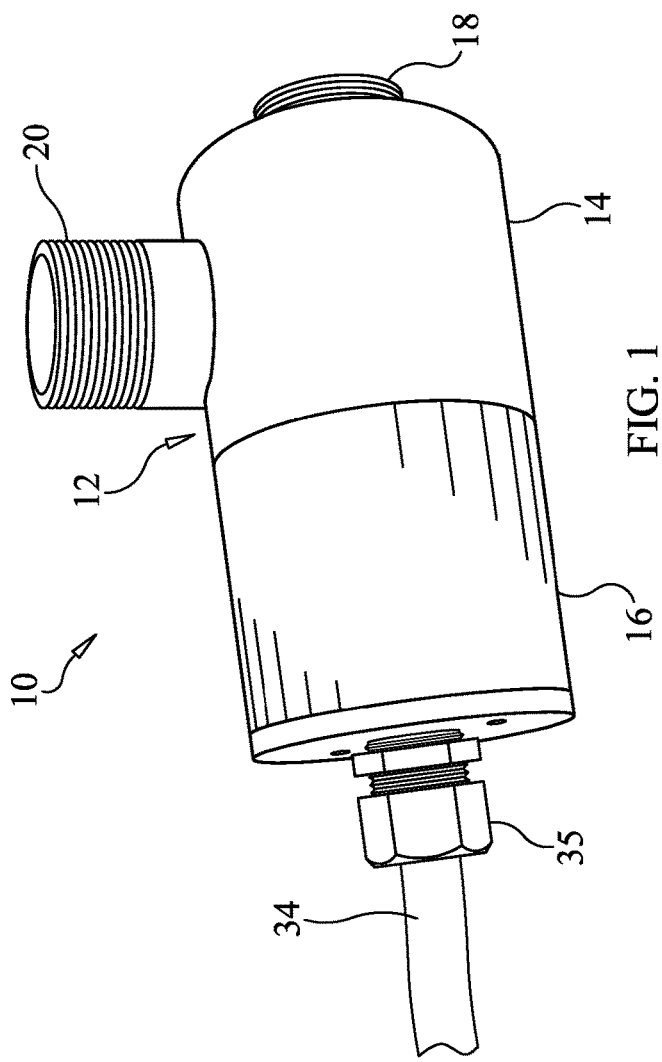
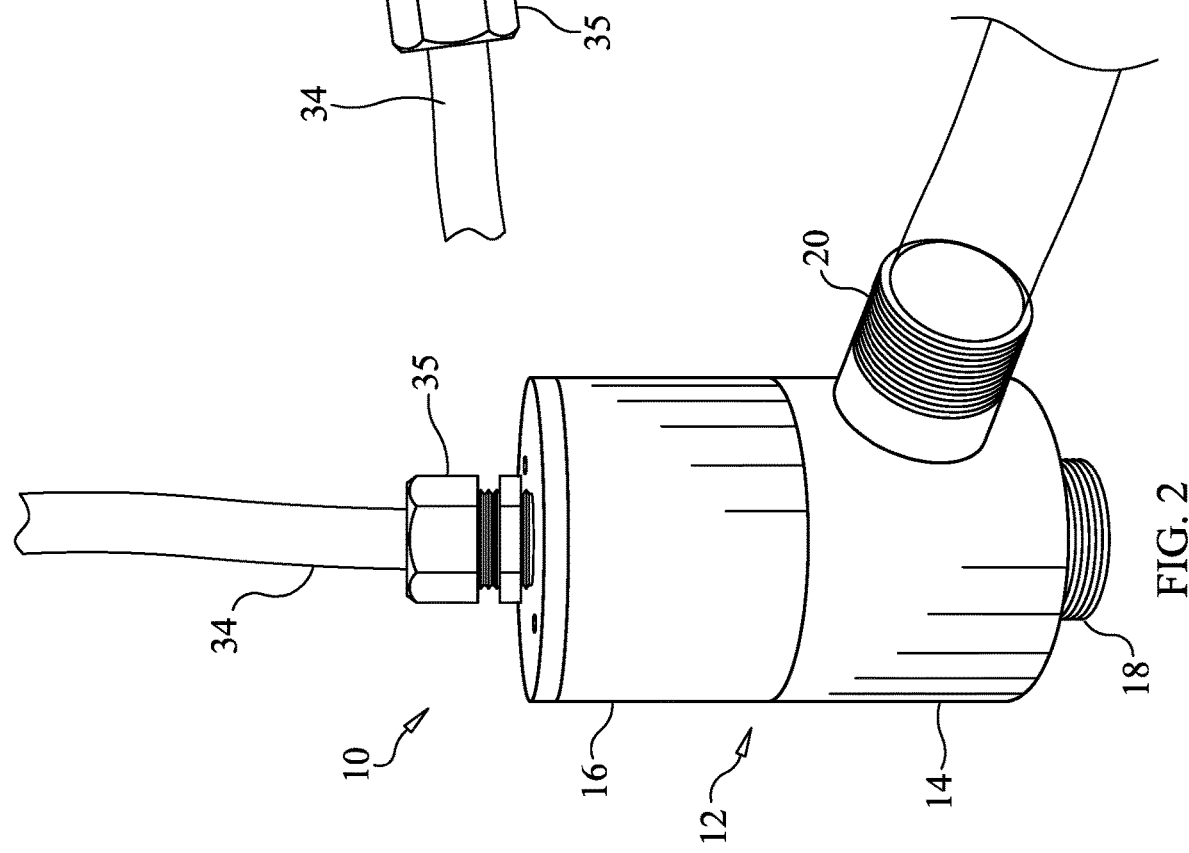

Solenoid Wiring

To Begin Flow
TURN POT (POTENTIOMETER)

Off — Full — 40

NOTE: To begin operating the bait pump, you must first turn the speed control knob (Turn Pot) to the OFF position. Then set the speed to the desired position to begin flow.

- 10 Gauge or Thicker — To (−) Battery
- 8 Gauge — To (+) Battery
- 10 Gauge or Thicker — To Switch
- 10 Gauge — To Pump Large Post / Small Post

HI-FLOW VARIABLE SPEED PUMP WITH WIRELESS REMOTE CONTROL

CROSS REFERENCE TO RELATED APPLICATIONS

This application is a continuation of U.S. patent application Ser. No. 15/342,278, filed on Nov. 3, 2016, now U.S. Pat. No. 10,267,316, which claims the benefit of provisional U.S. Patent Application Ser. No. 62/250,169, filed on Nov. 3, 2015.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates to pump systems, and more particularly to a variable-speed, high-capacity pump system for circulating water for a variety of applications, including marine bait well circulation and process water circulation.

2. Description of Related Art

Marine vessels use pumps to circulate water for a number of applications including baitwell circulation, process water circulation, and potable water supply. Baitwells, live wells, and bait tanks are among the more commonly used terms to describe water tank systems installed on marine vessels for temporary storage of live marine life, such as bait fish. These systems typically including a tank or well, which come in various sizes (e.g. gallon capacities), and which may include a variety of options such as pumps and aerators. The systems may be configured as: (1) an "open system" wherein new oxygen rich water is continually pumped into the tank while old water flows out and back to sea; or (2) a "closed system" wherein the water is merely recirculated. A constant flow of water provides the fish with necessary oxygen to prevent oxygen starvation to ensure survival. Maintaining proper water flow is important, as insufficient flow can lead to impurities to build-up, whereas too much flow can cause turbulence causing the bait fish to die from exhaustion or scale loss. As a result, baitwell pumps limited to non-variable constant flow output suffer from a significant limitation.

Baitwell pumps typically run for many hours at a time in harsh marine environments. As a result of hard use in extreme environments, conventional baitwell pumps have been known to suffer from reliability issues. A number of baitwell pump failures have been attributed to the pump drawing in air causing "air locks" which effect pump cooling and are known to cause pump failure due to overheating. In order to address this issue, a number of boat owners are forced to install a sea chest, which comprises a watertight box which is filled with water in order to maintain the baitwell pump(s) installed therein fully submerged. Installing sea chests, however, is expensive, adds weight to the vessel, and requires space which is in short supply.

As noted above, marine vessels employ pumps for a number of other applications including process applications, such as condenser water circulation for onboard air conditioning systems, as well as pumps for freshwater applications. In air conditioning applications, the pumps typically circulate seawater through a condenser coil in order to remove heat from the system and condense refrigerant. In other applications, marine pumps may be installed to pressurize fresh potable water for use in kitchens, wet bars, showers, and bathrooms. Regardless of the installation, pumps installed on marine vessels are subject to harsh marine environments, and have exhibited premature failures resulting from corrosion and other environmental factors. More particularly, a number of marine vessel pumps are fabricated using conventional brushed motor technology, and other components fabricated from materials that are susceptible to corrosion. As a result of these factors, marine pumps are known to exhibit premature failures.

BRIEF SUMMARY OF THE INVENTION

The present invention overcomes the limitations and disadvantages present with baitwell systems present in the art by providing a high-capacity pump fabricated with corrosion resistant components, and powered by a variable-speed brushless DC motor suitable for use with a wide variety of baitwell applications. A pump in accordance with the present invention includes a corrosion resistant compact housing fabricated from aircraft grade 5086 and 6061 Aluminum, Titanium, and DELRIN® (e.g. Polyoxymethylene). DELRIN® is a registered trademark of E. I. DuPont de Nemours and Company. The housing includes a motor and electronics section fabricated primarily from Aluminum, and an impeller section formed primarily from DELRIN®. The housing contains a brushless 12V DC motor which is controlled by a manual and wireless variable speed control to provide unparalleled flow control. The motor is contained within the housing in a sealed cavity in the housing, wherein the cavity is filled with mineral oil which maximizes heat transfer to facilitate motor cooling. A PVC impeller is contained within a PVC section of the housing thereby creating a corrosion resistant housing and impeller section. The pump of the present invention has achieved improved performance over known pumps, and is capable of delivering 4,500 gallons per hour (GPH) at 6 feet of head pressure, while only drawing 30 amps at 12 Volts DC.

Pump output is controllable between minimum and maximum flowrates by adjusting motor speed. The present invention provides two independent motor control systems, including a manual speed control knob or dial, and via a wireless electronic device such as a smartphone using a downloadable software application or App that allows for remote control of the pump. Providing wireless control is considered an important aspect of the present invention as it allows for remote activation and control of the pump from anywhere on the vessel.

Accordingly, it is an object of the present invention to provide an improved pump for marine applications.

Another object of the present invention is to provide a variable speed pump powered by a brushless DC motor.

Still another object of the present invention is to provide an improved pump fabricated from corrosion resistant materials.

Yet another object of the present invention is to provide a variable speed pump with improved motor cooling.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 1 is a side view of a pump in accordance with the present invention with the pump disposed in a horizontal configuration;

FIG. 2 is a side view of the pump disposed in a vertical configuration;

FIG. 7 illustrates a solenoid wiring schematic for the pump.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 3:
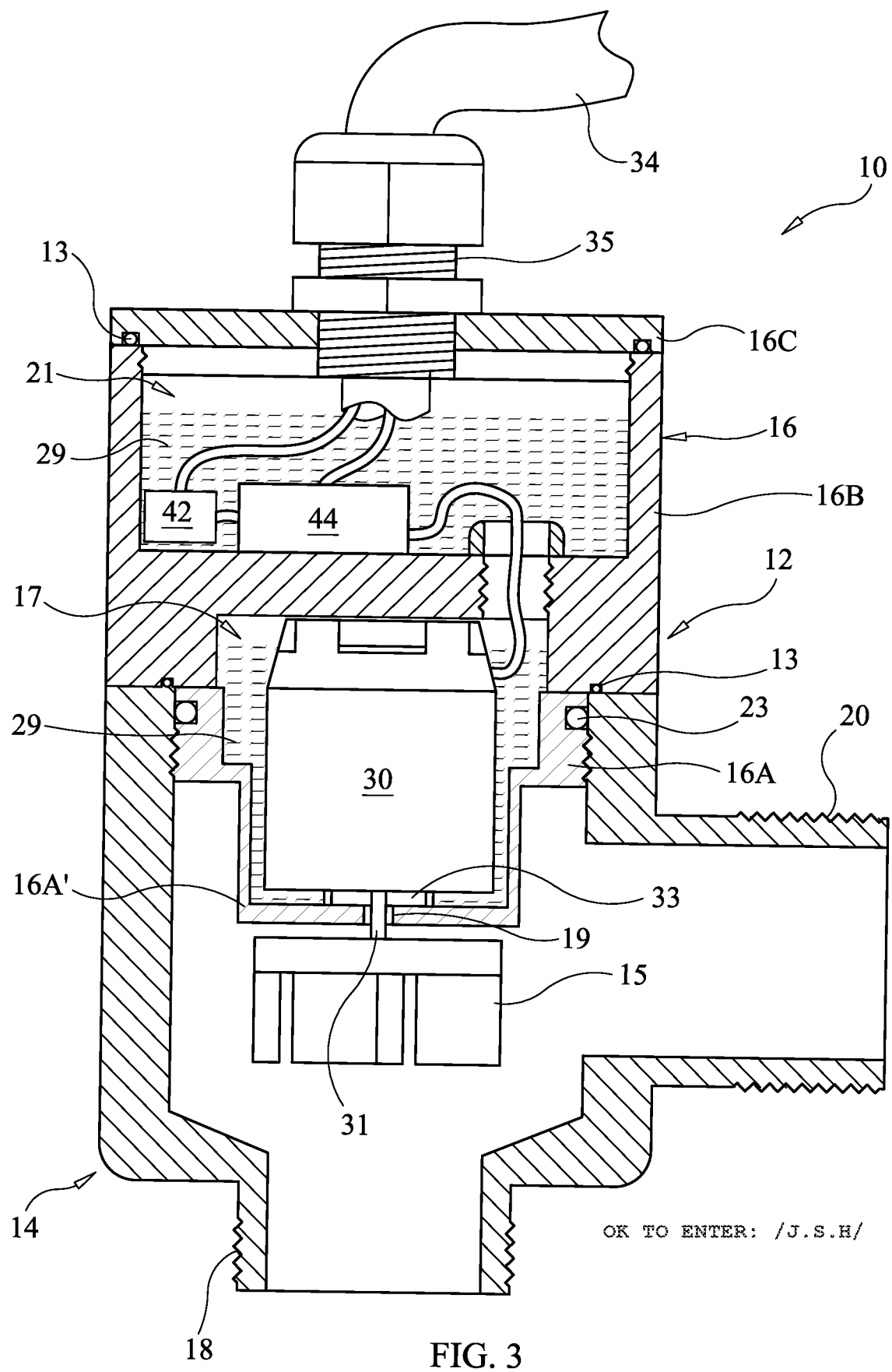
FIG. 3 is a schematic side sectional view of the pump.
Figure 4:
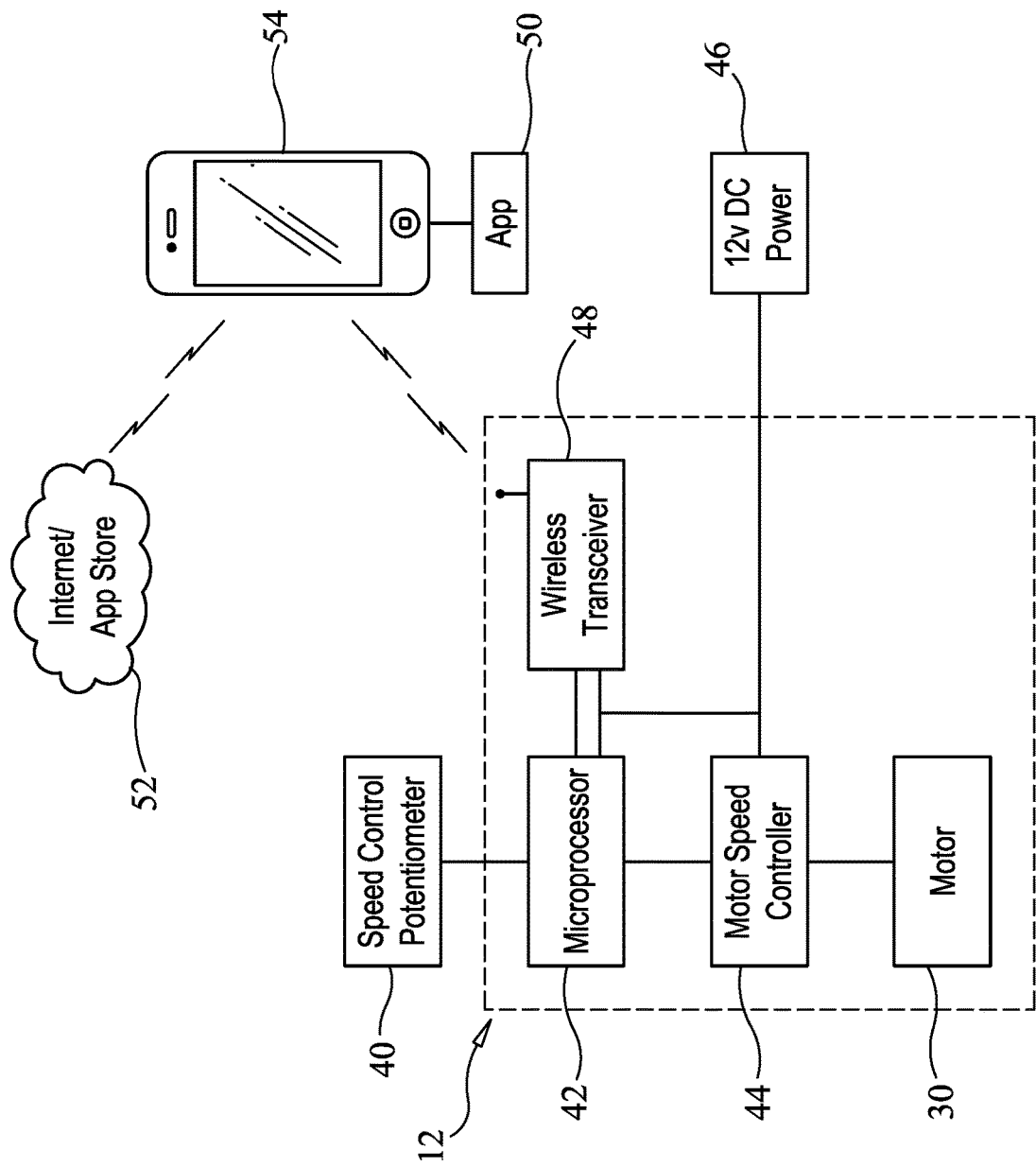
FIG. 4 is a schematic block diagram of the motor control architecture.
Figure 5:
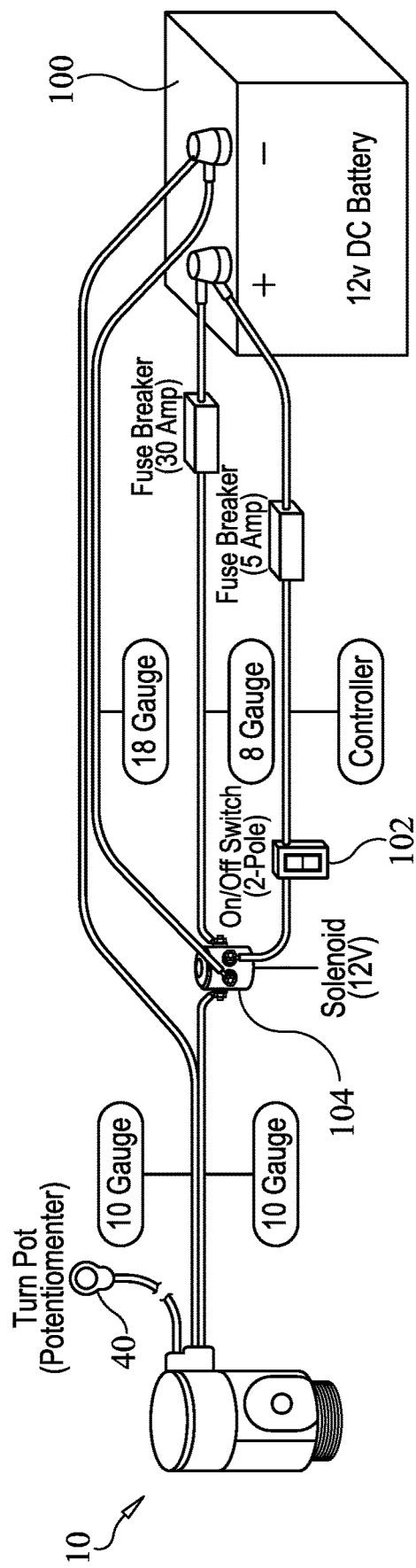
FIG. 5 illustrates a wiring schematic for the pump system using a single 12V battery.
Figure 6:
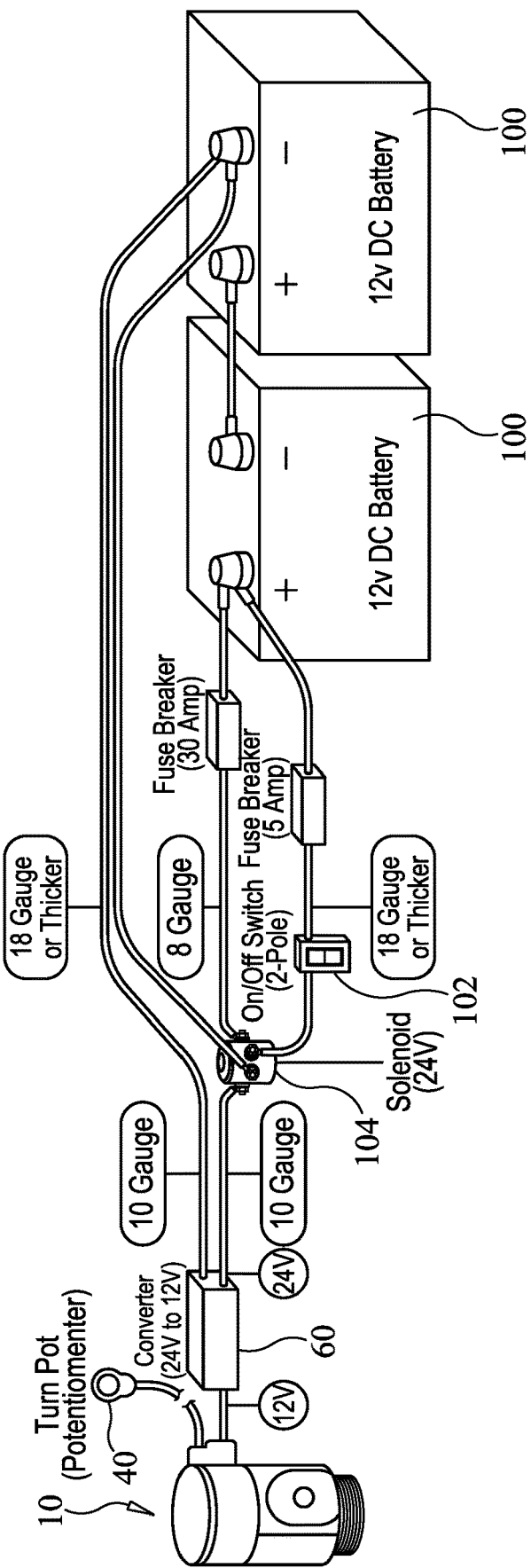
FIG. 6 illustrates a wiring schematic for the pump using two 12V batteries wired in series.

Turning now to the drawings, FIGS. 1-3 depict a pump, generally referenced as 10, in accordance with the present invention, FIG. 4 depicts a block diagram of the motor control architecture, and FIGS. 5-7 depict wiring schematics for use of the pump in marine baitwell pump applications. As noted above, pump 10 is suitable for a variety of marine vessel pumping applications as well as non-marine general use pumping applications. Accordingly, any reference to baitwell applications should not be construed as limiting.

With reference to FIGS. 1-3, pump 10 includes a housing assembly, generally to referenced as 12, including an impeller housing 14 and a motor/electronics housing assembly, generally referenced as 16. Housing 14 and housing assembly 16 are connected so as to form a watertight seal. Impeller housing 14 is fabricated from a non-corrosive material, preferably polyvinyl chloride ("PVC"), and contains an impeller 15, as seen in FIG. 3, which is fabricated from DELRIN®. An important aspect of the present invention involves fabricating impeller housing 14 as well as impeller 15 from a non-corrosive material, such as PVC and DELRIN®. Fabricating those components from lightweight and corrosion resistant materials renders the pump highly corrosion resistant. Housing 14 further includes a water inlet 18 and a water outlet 20. Water inlet 18 is generally axially disposed at the end of impeller housing 14 as illustrated in FIGS. 1 and 2. Water outlet 20 is generally perpendicularly disposed relative to inlet 18 and generally tangential relative to impeller housing 14 as seen in FIGS. 1 and 2. Water inlet 18 is formed by a cylindrical axially projecting pipe connection, which preferably defines a national pipe thread taper ("NPT") of 1.5" or 2.0", however any suitable size or threaded or non-threaded configuration is considered within the scope of the present invention. Water outlet 20 is formed by a cylindrical tangentially projecting pipe connection, which preferably defines a NPT outlet of preferably 1.25" or 1.5", or any other suitable outlet size or configuration. As should be apparent, during operation water is drawn into inlet 18 and discharged from outlet 20.

Motor/electronics housing assembly 16 is formed by three components, namely a motor housing component 16A, an electronics housing component 16B, and an end cap 16C, each of which is connected in a sealed/watertight manner. In an alternate embodiment, however, motor/electronics housing assembly may comprise a single main motor/electronics housing and end cap. Motor housing component 16A is in sealed threaded engagement with impeller housing 14 via an O-ring gasket or seal, referenced as 23. Motor housing 16A defines a motor receiving cavity 17 wherein an electric motor 30 is received and/or partially received. Electric motor 30 is preferably a 12 V DC powered brushless motor. Use of a brushless motor increases reliability by eliminating the use of brushes in conventional electric motors. Motor 30 has an output shaft 31 which projects from motor 30 through a bearing 33 and from housing 16A through a watertight seal 19. The terminal end of output shaft 31 is connected to impeller 15. Shaft 31 is preferably fabricated from a highly corrosion-resistant material, such as 316 stainless steel.

A significant aspect of the present invention involves enhanced motor cooling to prevent overheating, a known cause of failure for prior art systems. In accordance with this aspect of the invention, the area surrounding motor 30 within cavity 17 is substantially, but not fully, filled with mineral oil 29 which functions to lubricate, protect, and primarily cool motor 30. As used herein the term "mineral oil" shall be broadly construed to mean a distillation product of petroleum, or any other suitable non-conductive, non-corrosive, liquid. Partially filling cavity 17 allows for an air-gap (shown as blank space depicted above the mineral oil) that functions to accommodate thermal expansion of mineral oil 29. Surrounding motor 30 with a fluid, such as mineral oil, improves heat transfer from the motor due to the increased coefficient of heat transfer of the oil, as opposed to gas such as air. Accordingly, heat is readily transferred from the motor to the oil during operation. A further significant aspect of the present invention involves use of the pumped water to extract and discharge the heat. In this regard, a portion of the exterior of motor 16A, referenced as 16A' projects into impeller housing 14, and is in direct fluid contact with water flowing through impeller housing 14 as best seen in FIG. 3. Accordingly, heat transferred from motor 30 and to the mineral oil 29 disposed within cavity 17 is subsequently transferred from the mineral oil, through the wall of motor housing 16A, and into water within impeller housing 14, whereby the heat is extracted from the pump by discharge of the water from outlet 20. It is important to note that cavity 17 is only partially filled with mineral oil so as to leave a quantity of air therein, whereby the air allows for thermal expansion of the mineral oil in response to temperature increases thereby preventing excess pressure build-up on any seals or gaskets.

Electronics housing component 16B is preferably in sealing threaded engagement with motor hosing component 16A via an O-ring seal 13. Electronics housing component 16B defines a cavity 21 that contains, in a watertight environment, the electronic components used to power and control motor 30. A multi-conductor cable 34 brings 12V DC power and control signals into electronics housing component 16B via a watertight port 35 formed in end cap 16C. Power may be provided to microprocessor 42 and motor speed controller 44 in parallel or series or any other suitable electrical configuration. Included in cable 34 are conductors dedicated to electrically communicating variable speed control input signals from the manually adjustable speed control potentiometer 40 (illustrated in FIGS. 4 and 7) to microprocessor 42 via watertight wire connector 35 disposed in an aperture formed in housing component 16C. The speed control cable is preferably combined with power cable 34 in the form of a multi-conductor cable, however any suitable conductor configuration is considered within the scope of the present invention. Electronics housing component 16B also preferably contains mineral oil 29 which comprises a non-conductive liquid. Mineral oil functions to remove heat from the enclosed electronic components. More particularly, the heat generated within electronics housing component 16B is transferred to the motor housing component by conduction, and ultimately into the water flowing through the impeller housing whereby the heat is removed from the system. It is important to note that cavities 21 and 17 are only partially filled with mineral oil so as to leave a quantity of air therein which allows for thermal expansion of the mineral oil in response to temperature increases thereby maintaining the integrity of the various seals. A cap 16C is disposed in threaded engagement with housing component 16B, wherein an O-ring seal or gasket 13 maintains sealed engagement.

FIG. 4 is an electrical control block diagram for the electrical control system for the baitwell pump 10 in accordance with the present invention. The electrical control system includes a speed control potentiometer 40 which functions to allow for speed variation via direct user input by manual actuation of speed control knob (shown in FIG. 6). Speed control potentiometer 40 functions to provide a speed control signal to a microprocessor 42, which is in electrical communication with a motor speed controller 44. Microprocessor 42 receives the speed control signal and generates an output signal to motor speed controller 44 which uses that signal to controls the input voltage to motor 30. Using this control architecture, rotation of the control knob on speed control potentiometer 40 functions to vary motor speed resulting in a corresponding variance in water flow output. A 12V DC power source 46 is electrically connected to motor speed controller 44, and microprocessor 42 receives power therefrom. The 12 V DC power may be obtained directly from a 12V DC battery or from a pair of 12V DC batteries providing 24V DC to a converter as illustrated in FIG. 6.

A further significant aspect of the present invention involves the ability to control the pump via wireless communication. In accordance with this aspect of the invention, pump 10 is provided with a wireless transceiver 48 adapted to for exchanging data over short distances. In a preferred embodiment, wireless transceiver uses short-wavelength UHF radio waves in the ISM band from 2.4 to 2.485 GHz from fixed and mobile devices in accordance with the BLUETOOTH® standard. BLUETOOTH® is a registered trademark of Bluetooth SIG, Inc. of Kirdland Washington. While BLUETOOTH® is disclosed as the wireless transmission protocol in a first embodiment, the present inventor, however, contemplates the use of any suitable wireless communication protocol or standard.

In addition, a downloadable software application or APP 50 is provided for downloadable installation via the Internet 52 on a wireless enabled portable electronic device 54. Wireless electronic device 54 preferably comprises a smartphone. Once installed on electronic device 54, APP 50 provides for the wireless control of pump 10. More particularly, APP 50 generates a graphical user interface ("GUI") on device 54 which allows the user to send commands to and receive data from pump 10. APP 50 thus allows a user to remotely turn pump 10 "On" and "Off" while further allowing the user to make adjustments to pump flow between minimum and maximum settings. APP 50 further receives data from motor 10 via transceiver 48 and generates electronic output displays such that the user can monitor pump status, flow rates, etc.

FIG. 5 illustrates a wiring diagram for installation of pump 10 of the present invention in a baitwell application using a single 12V DC battery, referenced as 100. An on/off switch 102 is wired to a solenoid 104, whereby manual actuation of switch 102 (e.g. to the "on" position") activates solenoid 104 to provide 12V DC power to baitwell pump 10. FIG. 6 illustrates a wiring diagram for installation of a baitwell pump 10 of the present invention in an application wherein two 12 VDC batteries are wired in series thereby providing a 24V DC potential. In this application an on/off switch 102 is wired to a solenoid 104 such that manual activation of switch 102 to the on position activates solenoid 104. Upon activation of solenoid 104, 24V DC power is provided to a voltage converter 106, which reduces the voltage to 12 V DC. As illustrated voltage converter 106 in turn is electrically connected to baitwell pump so as to provide 12V DC operating voltage thereto. FIG. 7 provides a detailed illustration of the wiring of solenoid 104.

The present invention thus overcomes the limitations and disadvantages present with baitwell systems present in the art by providing a high-capacity pump fabricated with corrosion resistant components and powered by a variable-speed brushless DC motor suitable for use in baitwell applications as well as with a wide variety of other marine vessel applications. The pump of the present invention has achieved improved performance over known pumps and is capable of delivering 4,500 gallons per hour (GPH) at 6 feet of head pressure, while only drawing 30 amps at 12 V DC.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:
1. An electric pump comprising:
   an impeller housing, said impeller housing defining an interior volume and having a water inlet and a water outlet, said impeller housing formed of a non-corrosive synthetic plastic polymer;

an impeller disposed within the interior volume of said impeller housing, said impeller formed of a non-corrosive synthetic material;

a second housing assembly connected in sealing engagement to said impeller housing, said second housing assembly defining at least one cavity therein, said second housing assembly including a portion thereof projecting into the interior volume of said impeller housing, whereby water flowing through said impeller housing absorbs and carries away heat generated within said second housing assembly;

a brushless DC electric motor disposed within said second housing, said brushless DC electric motor having an output shaft projecting from said second housing through a watertight seal and into said impeller housing, said output shaft connected to said impeller;

a microprocessor and a motor speed controller disposed within said second housing assembly, said microprocessor in electric communication with said motor speed controller;

an external 12 VDC power source in electric communication with each of said microprocessor and said motor speed controller;

said motor speed controller in electrical communication with said brushless DC electric motor; and a motor speed control potentiometer located remote from said electric pump and in electrical communication with said microprocessor, whereby motor speed control signals from said motor speed control potentiometer are received by said microprocessor which generates an output signal to said motor speed controller which varies the input voltage to said brushless DC electric motor in response to said output signal.

2. The electric pump according to claim 1, wherein the at least one cavity of said second housing assembly is partially filled with mineral oil.

3. The electric pump according to claim 1, wherein said non-corrosive synthetic material comprises polyoxymethylene.

4. The electric pump according to claim 1, wherein said output shaft is formed from stainless steel.

5. The electric pump according to claim 1, wherein said second housing assembly is formed from Aluminum.

6. The electric pump according to claim 1 further including a wireless transceiver in electronic communication with said microprocessor and a wireless communications device configured for wireless communication with said wireless transceiver, said wireless communications device adapted to transmit wireless motor control signals to said wireless transceiver, whereby said wireless motor control signals are relayed to said microprocessor by said wireless transceiver to effectuate motor speed control.

* * * * *